United States Patent [19]

Orlicki et al.

[11] Patent Number: 5,471,314
[45] Date of Patent: Nov. 28, 1995

[54] LINE START SYNCHRONIZER FOR RASTER SCANNER

[75] Inventors: David M. Orlicki; James A. Larrabee, both of Rochester, N.Y.

[73] Assignee: Eastman Kodak Company, Rochester, N.Y.

[21] Appl. No.: 76,522

[22] Filed: Jun. 14, 1993

[51] Int. Cl.⁶ .................................................. H04N 1/21
[52] U.S. Cl. .......................... 358/296; 358/409; 358/412; 358/410; 347/116; 347/250
[58] Field of Search .................................. 358/409, 410, 358/412, 296, 298; 347/229, 234, 235, 248, 249, 250, 116, 3; 341/3, 6, 7, 9

[56] References Cited

U.S. PATENT DOCUMENTS

| | | | |
|---|---|---|---|
| 3,857,471 | 12/1974 | Hoffman et al. | 358/296 X |
| 4,037,231 | 7/1977 | Broyles et al. | 347/246 |
| 4,122,496 | 10/1978 | Childress et al. | 358/298 |
| 4,279,002 | 7/1981 | Rider | 358/409 |
| 4,325,086 | 4/1982 | Sato et al. | 358/298 |
| 4,858,019 | 8/1989 | Ohara et al. | 358/474 |
| 4,933,688 | 6/1990 | Brophy | 358/296 X |
| 4,942,478 | 7/1990 | Yamagishi et al. | 358/409 |
| 5,014,137 | 5/1991 | Shimada | 358/410 |
| 5,043,744 | 8/1991 | Fantuzzo et al. | 347/250 |
| 5,105,206 | 4/1992 | Sarraf et al. | 347/259 |
| 5,119,128 | 6/1992 | Cherian | 355/200 |

*Primary Examiner*—Peter S. Wong
*Assistant Examiner*—Randy W. Gibson
*Attorney, Agent, or Firm*—Parkhurst, Wendel & Rossi

[57] ABSTRACT

A reliable, low cost system for generating precisely aligned pixel clock and index signals for a digital scanning or printing system is based on the use of a phase locked loop multiplier to generate a sampling clock precisely synchronized to the drum position encoder sensor output. The sample clock frequency is chosen to be a large, known multiple M of the pixel clock frequency. The pixel clock is chosen to be the sample clock divided by M, making it the proper frequency. Pixel clock phase is established by resetting, on the trailing edge of an index signal generated by a line start index sensor, a $\div M$ counter used in deriving the pixel clock from the sample clock. The rising edge of the pixel clock is then established to within $\pm(1/M)$ pixel clock periods of the trailing edge of the index signal.

11 Claims, 3 Drawing Sheets

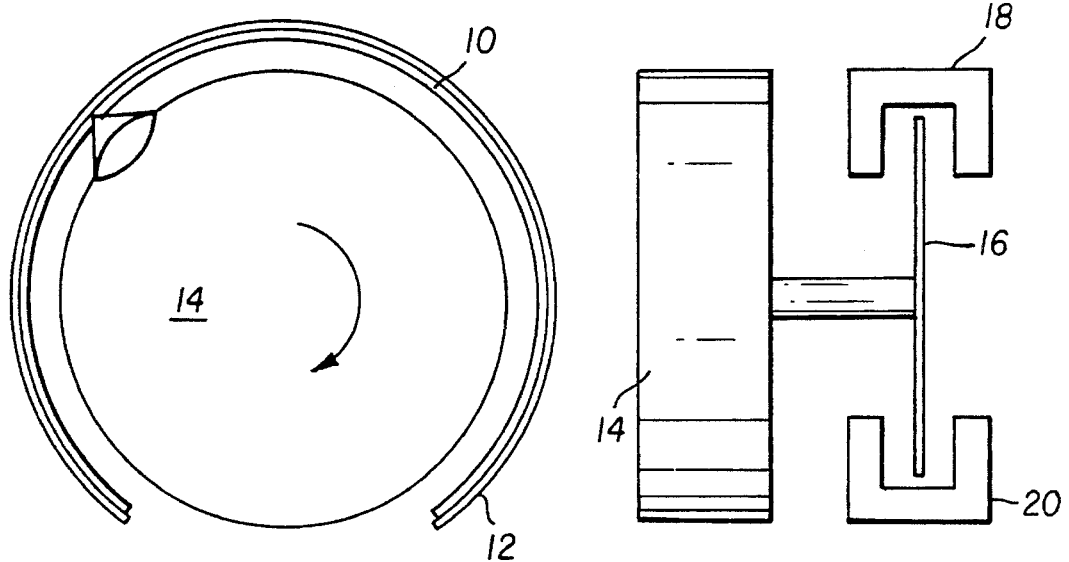
FIG. 1
(prior art)
FIG. 2
(prior art)
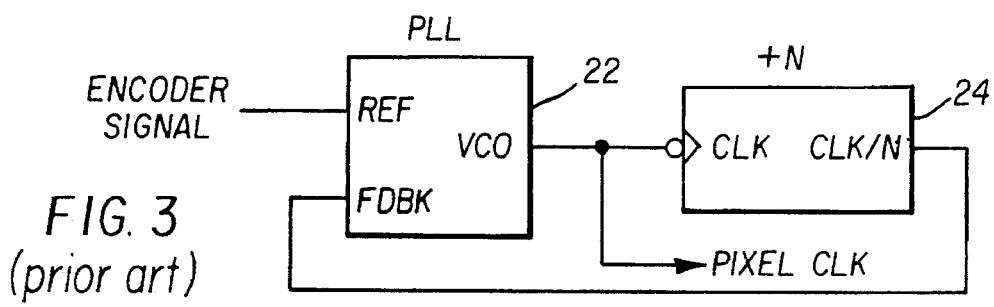
FIG. 3
(prior art)
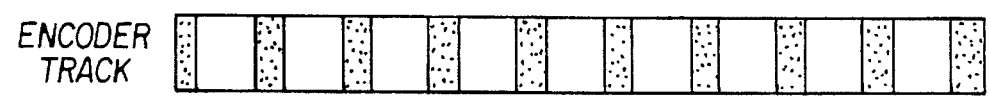
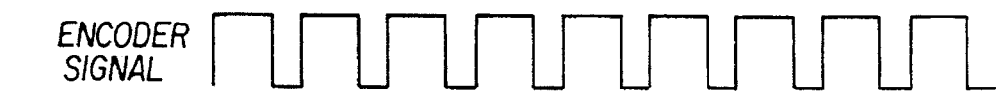
FIG. 4
(prior art)

LINE START SYNCHRONIZER FOR RASTER SCANNER

FIELD OF THE INVENTION

The invention relates in general to the field of electronic printing of photographic images. More specifically, the invention relates to circuits that control the timing of line writing operations in electronic photographic printers.

BACKGROUND OF THE INVENTION

Photographic printing of digitized images is accomplished by modulating the intensity of a light beam as the beam moves relative to a photosensitive media. The most common motion pattern has the beam move rapidly along a single line as a single row of pixels is modulated or "clocked out" starting from a fixed margin location. The beam is then indexed to the next line of the page and returned to the margin before writing the next row of pixels.

A high degree of precision is required in identifying the margin location and pixel boundaries since misalignment of the pixels by as little as ten percent of a single pixel width degrades the perceptible quality of the printed image. Conventional printers have employed a two channel position encoding scheme to prevent misalignment. One channel of relatively high resolution is used to generate a pixel clock while a second channel generates one index pulse per revolution at a fixed position relative to signal line start. Synchronization of the pixel clock and the index to assure line to line uniformity is not an easy matter, and systems employ precise alignment of the two encoder channels and associated sensors to insure non-coincidence of pixel clock and line start signal transitions.

In view of the above, it is an object of the invention to provide a reliable low cost means for generating precisely aligned pixel clock and index signals for a digital scanning or printing system.

SUMMARY OF THE INVENTION

The invention provides a reliable, low cost means for generating precisely aligned pixel clock and index signals for a digital scanning or printing system. A phase locked loop multiplier is used to generate a sampling clock precisely synchronized to the drum position encoder sensor output. The sample clock frequency is chosen to be a large, known multiple M of the pixel clock frequency. The pixel clock is chosen to be the sample clock divided by M, making it the proper frequency. Pixel clock phase is established by resetting, on the trailing edge of an index signal generated by a line start index sensor, a ÷M counter used in deriving the pixel clock from the sample clock. The rising edge of the pixel clock is then established to within ±(½M) pixel clock periods of the trailing edge of the index signal.

In a preferred encoder assembly, an encoder wheel having an encoder track and an index track is provided. A first sensor is used to read the encoder track and generate an encoder signal. A second sensor is used to read the index track and generate an index signal. A pixel clock circuit then generates a synchronized pixel clock in response to the encoder signal and the index signal. The pixel clock circuit preferably includes a phase lock loop circuit having a reference input, a feedback input and a signal output coupled to the clock inputs of first and third M factor dividers (divide by M counters); a second N factor divider (divide by N counter) including a clock input coupled to an output of the first M factor divider and a signal output coupled to the feedback input of the phase lock loop circuit; and reset means for resetting the third M factor divider on the falling edge of the index signal. In a preferred embodiment, N is in the range of three-200 and M is a large integer, typically about 100.

BRIEF DESCRIPTION OF THE DRAWINGS

Reference should now be made to the following detailed description of the preferred embodiments of the invention and the accompanying drawings, wherein:

FIG. 1 is a schematic representation of a side view of a print engine;

FIG. 2 is a schematic representation of a encoder wheel assembly attached to a rotating drum of the print engine shown in FIG. 1;

FIG. 3 illustrates a phase-lock-loop pixel clock generating circuit employing a voltage controlled oscillator and a divider;

FIG. 4 illustrates the relationships among the physical encoder track, the PLL clock circuit signals and a generated pixel clock;

DESCRIPTION OF THE INVENTION

Figure 5:
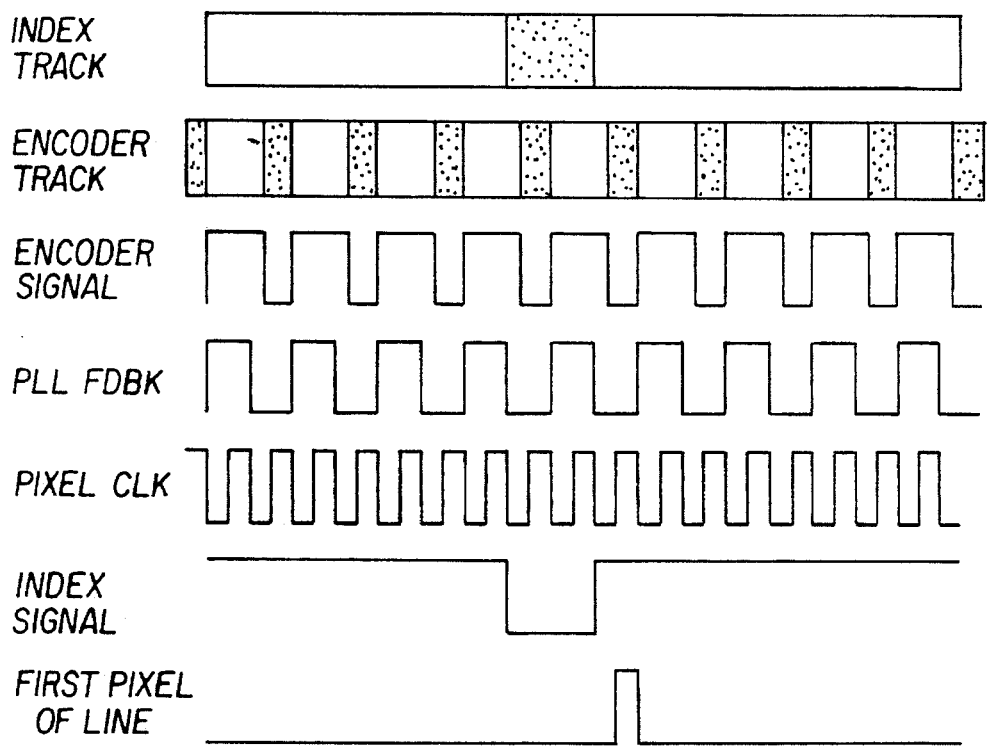
FIG. 5 illustrates the relationship between the generated pixel clock and an index pulse generated by the line start sensor shown in FIG. 2.

A side view of a print engine is schematically represented in FIG. 1. Photographic media 10 is supported as on the inner surface of a write media support cylinder 12, such that a write beam emitted from a rotating print drum 14, and modulated so as to represent information stored in successive pixels, writes a single image line on the photographic media 10 for each revolution of the rotating print drum 14. The print drum 14 is advanced one pixel width through the write support cylinder 12 for each revolution, so that the next line of pixels writes to the adjacent physical line on the photographic media 10.

Referring now to FIG. 2, the print drum 14 is attached to an encoder assembly that includes an encoder wheel 16, a motion encoder sensor 18 and a line start index sensor 20. The motion encoder sensor 18 is used to generate a multiple pulse per revolution encoder signal, based on an encoder track located on the encoder wheel 16, which is used to measure the location of the print drum 14. The line start index sensor 20 generates a single output per line index signal, based on an index track located on the encoder wheel 16, which is used to identify the image margin location. The line start index sensor 20 is usually mounted in the same assembly as the motion encoder sensor 18, as shown in FIG. 2, although other physical embodiments are sometimes employed.

In order to reduce the line count (lines per revolution) required for the encoder assembly, phase locked loop (PLL) multiplication of the encoder output frequency is commonly employed in the art. A pixel clock circuit employing a phase lock loop (PLL) circuit 22 with an internal voltage controlled oscillator (not shown) and. a divider 24 is illustrated in FIG. 3. The relationships among the physical encoder track, the pixel clock circuit signals and the generated pixel clock are displayed in FIG. 4. The duty cycle of the encoder output is arbitrary in general since the PLL is responsive only to rising edges. The action of the PLL pixel clock circuit is to drive the output (VCO) of the internal voltage controlled oscillator such that the divided down output pulse train (FDBK) contains coincident rising edges in one to one correspondence with those of the encoder signal. It should be noted that since the divider 24 is falling edge triggered, the recovered pixel clock contains falling edges coincident with encoder signal rising edges at a frequency N times that of the encoder.

The relationship between the generated pixel clock and an index pulse generated by the line start sensor 20 is shown in FIG. 5. The first rising edge in the pixel clock stream that occurs after the rising edge of the index signal is preferably chosen to clock out the first pixel of the line.

Figure 6:
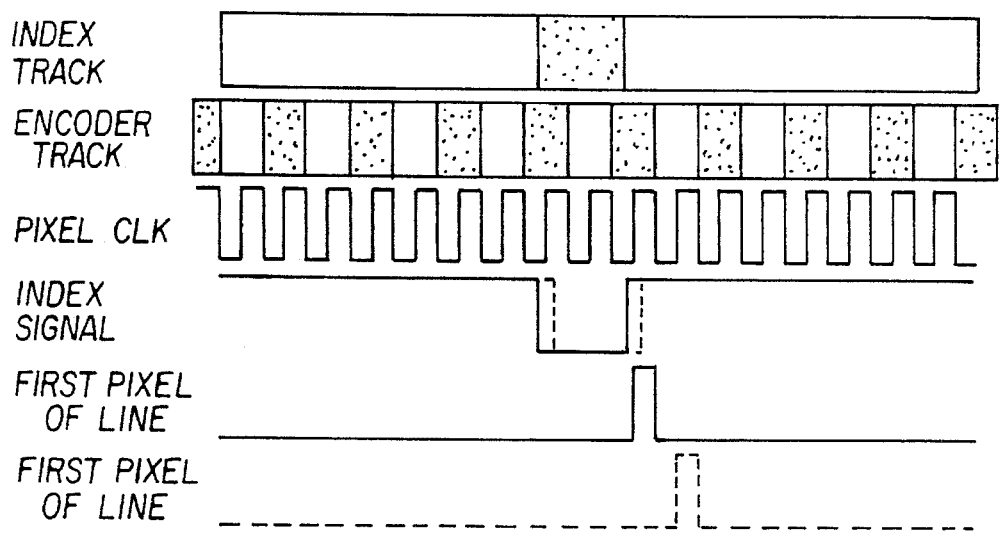
FIG. 6 illustrates the impact of small variations in index signal timing relative to the pixel clock.
Figure 7:
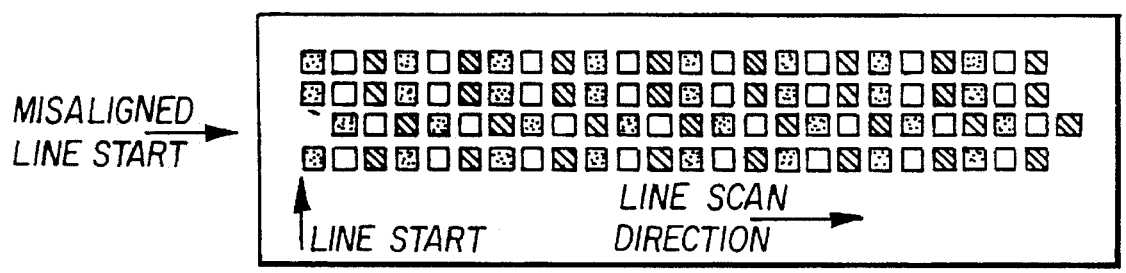
FIG. 7 illustrates the displacement of all pixels in a line due to the misplacement of the first pixel relative to previous lines.

The impact of small variations in index signal timing relative to the pixel clock is displayed in FIG. 6. If the rising edges of index signal and pixel clock are coincident, ambiguity exists in the choice of pixel clock interval for the first pixel of the line. Near the point of coincidence of these signals, extremely small variations in index signal or pixel clock location can result in full pixel width line displacement. If the first pixel is misplaced relative to previous lines, all succeeding pixels in that line will be displaced correspondingly as is illustrated in FIG. 7.

Figure 8:
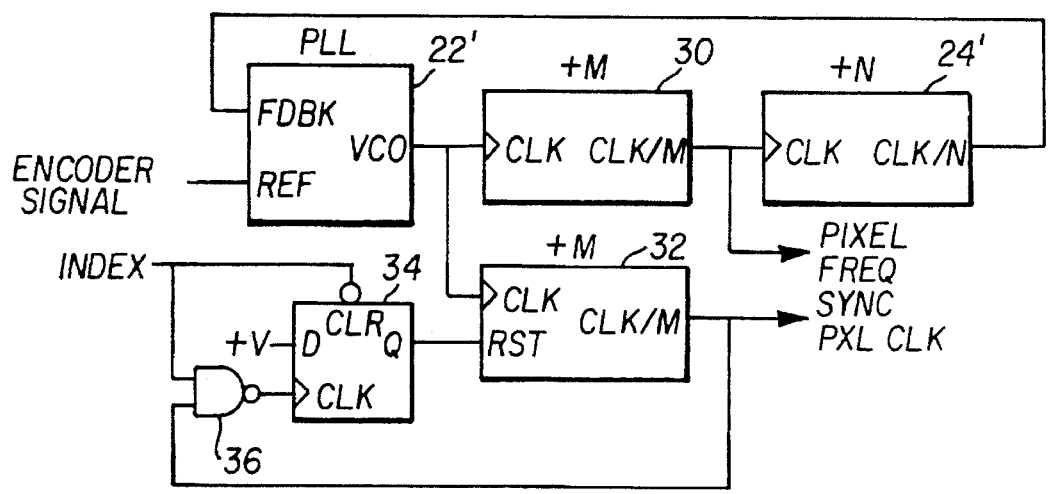
FIG. 8 illustrates a pixel clock circuit according to the invention.

Referring now to FIG. 8, a pixel clock circuit according to the invention is shown which reduces first pixel placement error by an arbitrary, user chosen factor M. As in the circuit illustrated in FIG. 3, the pixel clock is generated via PLL multiplication of the encoder signal. The output of the PLL circuit 22' is supplied to the input of a first divider 30 which has its output coupled to a second divider 24'. The output from the second divider 24' is supplied as the feedback signal (FDBK) to the feedback input of the PLL circuit. The output signal from the PLL circuit 22' (VCO) therefore has a frequency M×N times that of the encoder signal. Thus, the VCO output signal contains M precisely registered and synchronized (to the encoder signal) pulses per period of the pixel clock and there are N pixel periods per period of the encoder signals. The desired pixel clock frequency (PIXEL FREQ) is obtained by dividing VCO by M. In a preferred embodiment, N is in the range of three-200, and preferably 150, and M is a large integer, typically in the range of 100 to 200.

Figure 9:
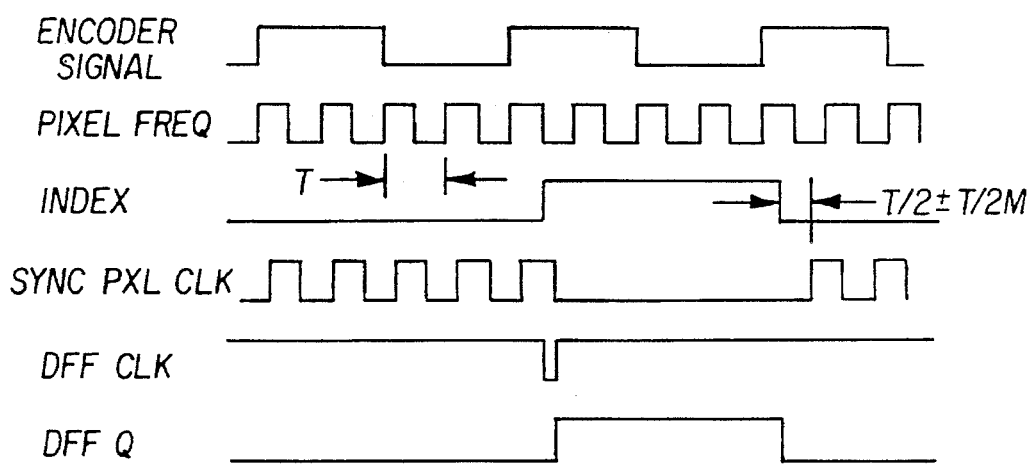
FIG. 9 is a timing diagram illustrating the various signals.

A synchronized pixel clock signal (SYNC PXL CLK), which is the actual clock signal supplied to the print drum to control the printing operation, is generated by a third resettable divider 32 having its clock input (CLK) coupled to the output of the PLL circuit 22' and its reset input (RST) coupled to the Q output of flip-flop 34. The output of the third divider 32 is coupled back to the clock input of the flip-flop 34 through a first input of a NAND gate 36. The other input of the NAND gate 36 receives the index signal (INDEX) generated by the line start index sensor 20. The clear input (CLR) of the flip-flop 34 also receives the index signal. In operation, the third divider 32 is initialized on the falling edge of the index signal. Thus, the phase of the SYNC PXL CLK signal is known to be within ±(½M) pixel clock periods as compared with the full pixel clock period uncertainty of conventional systems. FIG. 9 is a timing diagram illustrating the various signals.

The width and placement of the index signal are not precisely known. In general, the cycle of the SYNC PXL CLK signal will be splintered if the third divider 32 were merely held reset throughout the index signal pulse. Thus, in addition to initializing the count of the third divider 32 on the falling edge of the index signal, the illustrated circuitry guarantees that the SYNC PXL CLK signal cycle underway at the onset of the index signal is completed before gating off the output, thereby allowing the full use of both rising and falling edges of SYNC PXL CLK signal in the data path of a printing machine utilizing the circuitry without timing compromise in the vicinity of the index signal.

The synchronization of the first pixel clock edge with the falling edge of the index signal could easily be obtained by substituting the VCO input to the resettable third divider 32 with any fixed, high frequency clock. Such a scheme, however, would generate pixel clock edges precisely spaced in time instead of in angular distance in the printing machine. That is, if the print drum speeds up in the case of a fixed clock system, pixels will become further spaced. A PLL derived clock, however, will speed up with the drum and maintain uniform pixel spacing along a printed line. The use of the PLL derived clock is critical to insure that pixel placement remains accurate over the small, but significant, range of speeds encountered in realizable systems.

The invention has been described with reference to certain preferred embodiments thereof, it will be understood, however, that modifications and variations are possible within the scope of the appended claims.

| PARTS LIST |  |
|---|---|
| 10 | PHOTOGRAPHIC MEDIA |
| 12 | WRITE MEDIA SUPPORT CYLINDER |
| 14 | ROTATING PRINT DRUM |
| 16 | ENCODER WHEEL |
| 18 | MOTION ENCODER SENSOR |
| 20 | LINE START INDEX SENSOR |
| 22 | PHASE LOCK LOOP (PLL) CIRCUIT |
| 22' | PLL CIRCUIT |
| 24 | DIVIDER |
| 24' | SECOND DIVIDER |
| 30 | FIRST DIVIDER |
| 32 | THIRD RESETTABLE DIVIDER |
| 34 | FLIP-FLOP |
| 36 | NAND GATE |

What is claimed is:

1. An apparatus comprising: an encoder wheel having an encoder track and an index track; a first sensor for reading the encoder track and generating an encoder signal; a second sensor for reading the index track and generating an index signal; a pixel clock circuit for generating a synchronized pixel clock in response to the encoder signal and the index signal, wherein the phase of the synchronized pixel clock signal is within one-half a pixel clock period of the index signal.

2. An apparatus as claimed in claim 1, wherein the pixel clock circuit comprises: a phase lock loop circuit having a reference input, a feedback input and a signal output coupled to the clock inputs of first and third M factor dividers; a second divide by N factor divider including a clock input coupled to an output of the first M factor divider and a signal output coupled to the feedback input of the phase lock loop circuit; and reset means for resetting the third M factor divider on the falling edge of the index signal, wherein M and N are integers.

3. An apparatus as claimed in claim 2, wherein the reset means includes a flip-flop circuit having an output coupled to a reset input of the third M factor divider, a clear input coupled to received the index signal from the second sensor and a clock input coupled to a NAND gate having a first input coupled to the output of the third M factor divider and a second input coupled to receive the index signal from the second sensor.

4. An apparatus as claimed in claim 2, wherein the phase of the synchronized pixel clock signal is within $\pm(\frac{1}{2}M)$ pixel clock periods of the index signal.

5. An apparatus as claimed in claim 2, wherein N is in the range of three-200 and M is in the range of about one hundred to 200.

6. An electronic printing apparatus comprising:

a write media support cylinder; a rotatable print drum located within the write cylinder; and an encoder assembly coupled to the rotatable writing drum; wherein the encoder assembly comprises an encoder wheel having an encoder track and an index track; a first sensor for reading the encoder track and generating an encoder signal; a second sensor for reading the encoder track and generating an index signal; a pixel clock circuit for generating a synchronized pixel clock in response to the encoder signal and the index signal, wherein the phase of the synchronized pixel clock signal is within one-half a pixel clock period of the index signal.

7. An apparatus as claimed in claim 6, wherein the pixel clock circuit comprises: a phase lock loop circuit having a reference input, a feedback input and a signal output coupled to the clock inputs of first and third M factor dividers; a second N factor divider including a clock input coupled to an output of the first M factor divider and a signal output coupled to the feedback input of the phase lock loop circuit; and reset means for resetting the third M factor divider on the falling edge of the index signal, wherein M and N are integers.

8. An apparatus as claimed in claim 7, wherein the reset means includes a flip-flop circuit having an output coupled to a reset input of the third M factor divider, a clear input coupled to received the index signal from the second sensor and a clock input coupled to a NAND gate having a first input coupled to the output of the third M factor divider and a second input coupled to receive the index signal from the second sensor.

9. An apparatus as claimed in claim 7, wherein the phase of the synchronized pixel clock signal is within $\pm(\frac{1}{2}M)$ pixel clock periods of the index signal.

10. An apparatus as claimed in claim 7, wherein N is in the range of three-200 and M is in the range of about one hundred to two hundred.

11. An apparatus as claimed in claim 2 wherein N is the number of pixel periods derived by the phase lock loop per period of the encoder signal and M is the number of subdivisions of a given pixel period derived by the phase lock loop.

* * * * *